Figure 1:
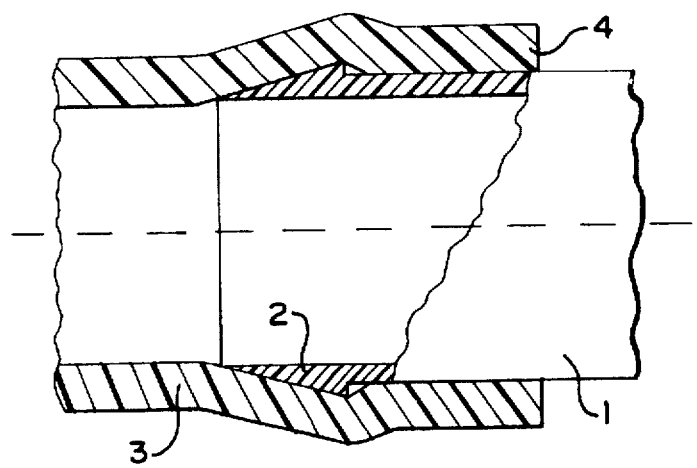

United States Patent [19]
Imgam

[11] Patent Number: 5,735,554
[45] Date of Patent: Apr. 7, 1998

[54] TUBE CONDUIT CONNECTION AND METHOD OF PRODUCING THE SAME FROM POLYOLEFINS

[76] Inventor: Fredrich Imgam, Am Frankfurter Weg 2, 63133 Heusenstamm, Germany

[21] Appl. No.: 702,793

[22] Filed: Aug. 26, 1996

Related U.S. Application Data

[63] Continuation of Ser. No. 204,136, filed as PCT/EP92/01923 Aug. 21, 1992, abandoned.

[30] Foreign Application Priority Data

Aug. 31, 1991 [EP] European Pat. Off. .............. 91114686

[51] Int. Cl.[6] ..................... F16L 47/00; B29C 27/00
[52] U.S. Cl. .................. 285/239; 285/242; 285/381; 29/508
[58] Field of Search ................. 285/909, 242, 285/238, 236, 239, 382, 381; 29/505, 508

[56] References Cited

U.S. PATENT DOCUMENTS

| | | |
|---|---|---|
| 2,292,752 | 8/1942 | Gee . |
| 3,217,400 | 11/1965 | Illesy . |
| 3,315,986 | 4/1967 | Quick ........................ 283/242 |
| 3,953,059 | 4/1976 | Carroll et al. . |
| 3,972,548 | 8/1976 | Roseen . |
| 4,039,212 | 8/1977 | Skarud ...................... 285/381 R |
| 4,070,044 | 1/1978 | Carrow . |
| 4,169,477 | 10/1979 | Bokros ........................ 285/909 |
| 4,310,184 | 1/1982 | Campbell ...................... 285/238 |
| 4,313,629 | 2/1982 | Winterhalter .................. 285/242 |
| 4,440,712 | 4/1984 | Imgram ....................... 285/186 |
| 4,486,034 | 12/1984 | Saver ........................... 285/242 |
| 4,521,041 | 6/1985 | Cox et al. . |
| 4,537,183 | 8/1985 | Fogarty ....................... 285/242 |
| 4,635,972 | 1/1987 | Lyau .......................... 285/242 |
| 4,783,303 | 11/1988 | Imgram ....................... 264/535 |
| 4,893,848 | 1/1990 | Melcner ....................... 285/258 |
| 4,911,484 | 3/1990 | Hackforth . |
| 5,123,627 | 6/1992 | Hodges ........................ 225/179 |
| 5,169,176 | 12/1992 | Brossard ...................... 285/242 |
| 5,340,167 | 8/1994 | Morste ........................ 285/909 |

FOREIGN PATENT DOCUMENTS

| | | | |
|---|---|---|---|
| 138791 | 7/1949 | Australia ..................... | 285/242 |
| 220055 | 8/1957 | Australia . | |
| 220053 | 8/1957 | Australia ..................... | 285/242 |
| 425180 | 12/1967 | Australia . | |
| 175285 | 11/1978 | Czech Rep. . | |
| 0102919 | 6/1983 | European Pat. Off. . | |
| 0102919 | 3/1984 | European Pat. Off. . | |
| 0246833 | 11/1987 | European Pat. Off. . | |
| 0405030 | 1/1992 | European Pat. Off. . | |
| 2555283 | 5/1985 | France . | |
| 1291108 | 3/1969 | Germany . | |
| 8015077 | 11/1980 | Germany . | |
| 3608843 | 9/1987 | Germany . | |
| 89804 | 12/1958 | Netherlands ................... | 285/242 |
| 532744 | 2/1973 | Switzerland . | |
| 903757 | 8/1962 | United Kingdom . | |
| 928911 | 6/1963 | United Kingdom . | |
| WO 81/02459 | 9/1981 | WIPO . | |
| 184486 | 8/1994 | WIPO ........................ | 285/242 |

OTHER PUBLICATIONS

Gallenkamp Catalogue pp. 138 and 764–767.
Ullmann's Encyclopedia of Industrial Chemistry, vol. A21, p. 394.
REHAU brochure, Aug. 1989 (eight total pages).

*Primary Examiner*—Eric K. Nicholson
*Attorney, Agent, or Firm*—Lee, Mann, Smith, McWilliams, Sweeney & Ohlson

[57] ABSTRACT

A tube conduit connection and method of producing the same, whereby an end of a pipe made of polyolefin is cold-deformed, i.e. at the ambient temperature, by means of a spreading mandrel. After the spreading mandrel is removed, the enlarged pipe end and a desired connecting piece or the end of another pipe are plugged onto each other. The polyolefin pipe end is then deformed back to the original shape and forms by self-redeformation a solid and gas-tight connection with the connecting piece or the end of the other pipe.

7 Claims, 2 Drawing Sheets

TUBE CONDUIT CONNECTION AND METHOD OF PRODUCING THE SAME FROM POLYOLEFINS

This application is a continuation of application Ser. No. 08/204,136, filed as PCT/EP92/01923 Aug. 21, 1992, now abandoned.

The invention relates to a method of producing a tube conduit connection in which method a tube end of a tube made of polyolefin, is expanded and placed onto a connector member, as well as a tube conduit connection thus produced.

In a known method of this type as published in German Published Patent Application No. P 38 17 442.1, there is produced such tube conduit connection by means of, for example, a shrink-on sleeve which bridges the connector members of two tubes. The shrink-on sleeve may be made of, for example, a thermo-elastic material like cross-linked polyolefin. The shrink-on sleeve is connected to the connector members in that the cross-linked polyolefin, after being heated above the crystallite melting point, can be deformed in the heated condition and pushed with expansion onto the connector members in the heated condition. In the same manner, the tube end of a tube made of cross-linked polyolefin also can be pushed onto a connector member, for example, a T-piece.

Carrying out this method in practice results in some difficulties because the cross-linked polyolefin must be heated to relatively high temperatures, for example, above 135° C. in the case of cross-linked poly ethylene, and has sufficiently ready deformability only at this temperature. Therefore, it is decisive that the concerned parts are connected to each other within a brief time period such that there is no cooling below the crystallite melting point during this period of time.

It is the object of the invention to provide a method of producing a tube conduit connection of the initially mentioned type and which method permits producing a secure tube conduit connection under normal, i.e. environmental temperatures. It is also an object of the invention to provide a tube conduit connection which can be produced under environmental conditions and constitutes a secure sealing connection.

According to the invention and with regard to the method, the object is achieved in that the end of the tube which has an internal diameter smaller than the external diameter of the connecting member, is reversibly expanded at environmental temperature with the assistance of an expanding mandrel to an internal diameter which is greater than the external diameter of the connecting member, and, after removal of the expanding mandrel, the still expanded end of the tube and the connecting member are telescoped onto each other, whereby the connecting member and the tube end are firmly and sealingly interconnected due to the self-reconversion of the reversibly expanded tube end.

Regarding the tube conduit connection, the object is achieved by the tube conduit connection being constituted by a connector member and a tube which has a tube end expanded at environmental temperature, and which is self-reconvertible at environmental temperature, the tube end being firmly and sealingly connected to an end portion of the connector member, the tube having an internal diameter which is smaller than the external diameter of the connector member.

The invention is based on the surprising recognition that polyolefins, in particular medium density, high density or cross-linked polyolefins, have sufficiently extensive, reversible deformability even in the cold and partially crystalline condition, i.e. in a condition in which such material is not heated above the crystallite melting point. This means that the polyolefin can be deformed or shaped under mechanical action, however, in its deformed condition, tends to reassume the original shape. Upon application of sufficiently strong forces, for example, by means of an expanding mandrel of conventional construction for expanding tubes, it is, therefore, possible to reversibly expand the tube ends of tubes made of polyolefins. Under the conditions prevailing at environmental temperature, the self-reconversion to the original condition, i.e. the original tube width, proceeds at relatively low speed so that the expanding mandrel can be removed from the expanded tube end and the still expanded tube end can be telescoped onto the respectively desired connector member. On the other hand, the speed of self-reconversion is sufficiently high so that there do not arise any undue waiting periods.

When compared to other materials, polyolefins have the advantage that the expansion as far as still existing after connection to the connector member, does not result in stress cracks.

The inventive method thus offers a particularly advantageous possibility of connecting tubes which are made of polyolefins, especially tubes made of medium density, high density or cross-linked polyolefins, with a respectively desired connector member without the expense of heat energy. When carrying out this method, there is obtained a particularly firm and sealing, specifically gas-tight connection due to the self-reconversion of the expanded tube end. During such self-reconversion, the polyolefin adapts to surface structures which are eventually present at the connector member. As examples for such surface structures which increase the bonding strength, there may be considered beads, flutes, grooves or knurlings which are engaged by the reconverted polyolefin.

In connection with the precedingly described method further securing of the produced tube conduit connections is possible, if required. This purpose is served by tube clamps of conventional type. However, it is also possible to attach a tension ring to the tube end of the tube which is made of polyolefin. In the event that such tension ring is also made of reversibly deformable material, the tension ring may be attached to the tube end from the start. It is, however, also possible to push a tension ring which is made of a material, for example, metal which is not or only little deformable, onto the tube-sided end of the tube conduit connection using known hydraulic means, after the tube conduit connection has been produced.

Figure 2:
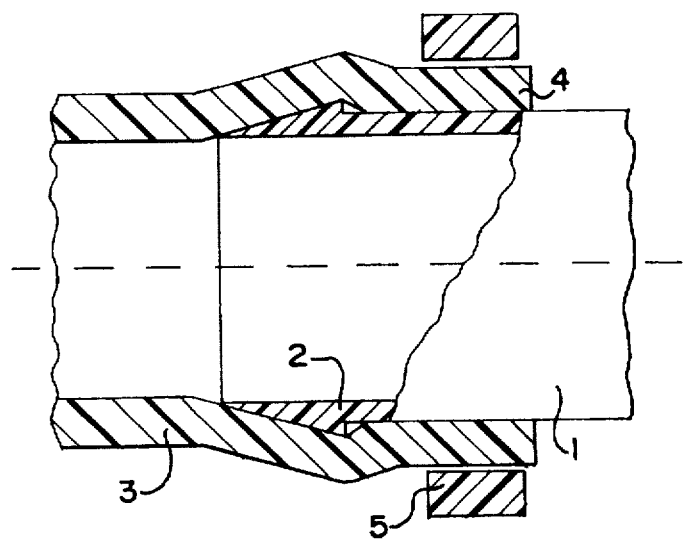
Figure 3:
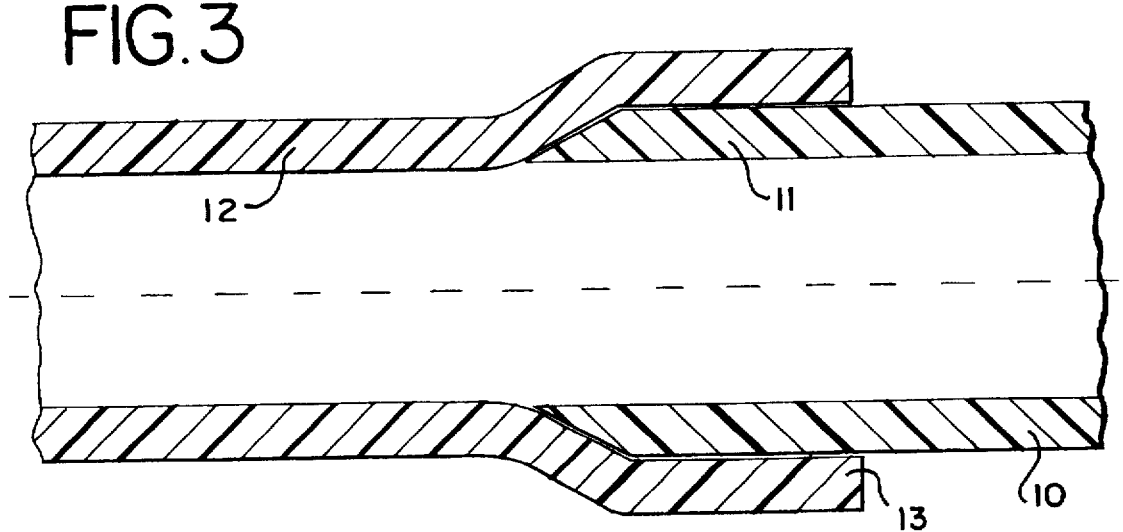
Figure 4:
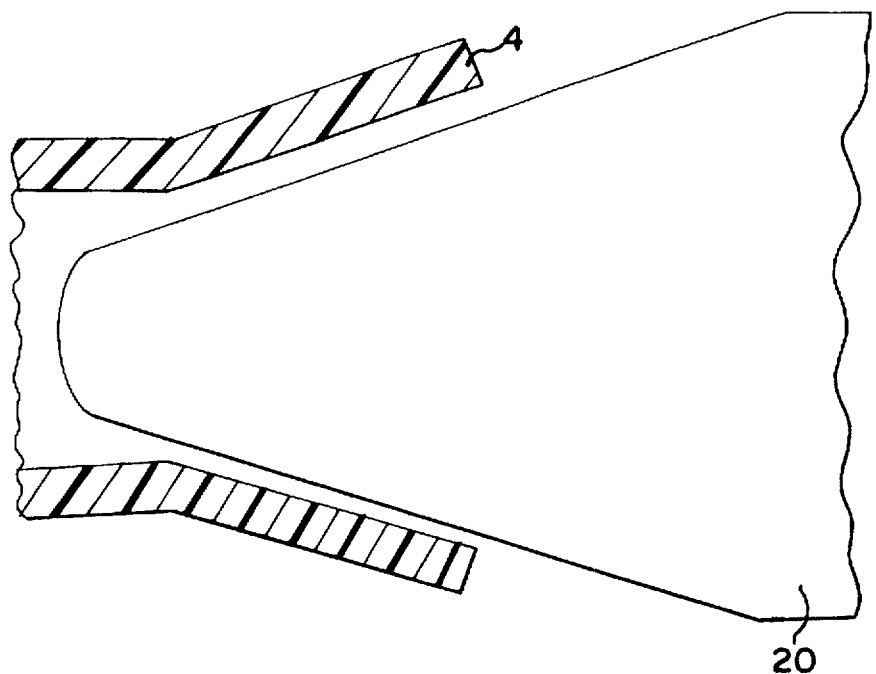
Figure 5:
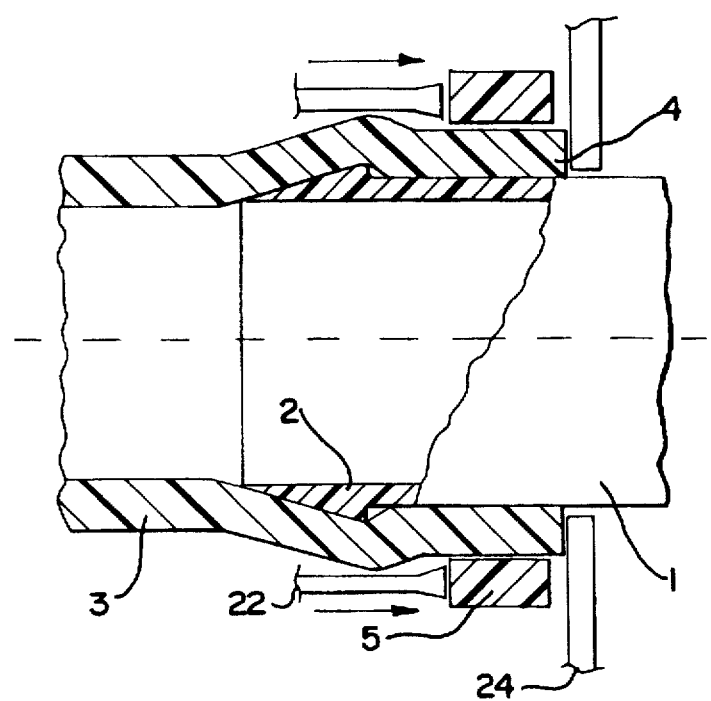

Exemplary embodiments of tube conduit connections produced in accordance with the inventive method are illustrated in the drawings and will be explained and described hereinbelow in detail with reference to the reference numerals. There are shown in FIG. 1 a sectional view of a tube conduit connection produced from a connector member and a tube end applied thereto according to the inventive method;

FIG. 2 a sectional view of a tube conduit connection as shown in FIG. 1 and containing a tension ring;

FIG. 3 a sectional view of the inventive tube conduit connection formed between two tube ends;

FIG. 4 a sectional view of a conventional step of using an expanding mandrel 20 to expand a tube end 4; and FIG. 5 a sectional view of a conventional step of a pushing means 22 hydraulically pushing a tension ring 5 onto a tube end while the tube 3 is held in place by a conventional holding means 24.

In the sectional view of FIG. 1, there will be recognised a connector member 1 which may constitute, for example, a straight tube piece, an angle tube or any other connector for connecting two tubes, however, also a triple connector piece like a T-piece. This connector member 1 is made of a material like metal, glass, ceramic, plastic or any other material selected with the view of the intended purpose of use. At each junction place the connector member 1 is provided with a surface structure for increasing the bonding strength. In the illustrated exemplary embodiment, this surface structure is formed by a thickened end portion 2 which tapers towards the end. Instead, there may be provided one or more beads, flutes or grooves or also knurlings or the like.

The illustration of FIG. 1 shows a tube 3 made of polyolefin, preferably medium density or high density, particularly cross-linked polyolefin. The internal diameter of the tube 3 is smaller than the external diameter of the connector member 1; as illustrated, the internal diameter may be substantially equal to the internal diameter of the connector member 1 whereby there can be prevented the formation of flow resistance due to constrictions or deposits formed at the constrictions from the medium flowing through the connector member 1 and the tube 3. For producing the tube connection, the tube end 4 is expanded at environmental temperature, using, for example, a conventional expanding mandrel, to an extent such that the internal diameter of the tube end 4 is at least as wide as the external diameter of the connector member 1 in the area of the thickened end portion 2. After being pushed beyond the thickened end portion 2, the tube end 4 is subject to self-reconversion to the original dimensions. As a consequence, the tube end 4, as illustrated, adapts to the external profile of the connector member 1. Since the tube end 4 originally had an internal diameter which is smaller than the external diameter of the connector member 1, the tube end 4 tightly engages along its length the end portion 2 of the connector member 1. There is thus formed in the end a relatively large-area, very tight connection between the tube end 4 and the connector member 1.

FIG. 2 shows a further embodiment of the aforedescribed tube conduit connection and corresponding members therein are provided with the same reference numerals. In this embodiment, a tension ring 5 is provided as additional securing means for producing a sealing connection between the tube end 4 and the connector member 1. This tension ring 5 preferably is made of the same material as the tube 3. In the illustrated exemplary embodiment, the tube 3 as well as the tension ring 5 are made of cross-linked poly ethylene. The internal diameter of the tension ring 5 is closely adapted to the external diameter of the tube 3 and is pushed onto the tube end 4 prior to making the tube conduit connection. During the subsequent expanding operation, the tension ring 5 is temporarily expanded conjointly with the tube end 4 such that the expanded tube end 4 is placed onto the end portion 2 of the connector member 1 together with the applied tension ring 5. Subsequent self-reconversion, then, results in the sealing connection between the tube end 4 and the end portion 2 of the connector member 1 in the aforedescribed manner, whereby also the tension ring 5 contracts and thus additionally presses the tube end 4 against the end portion 2 in the area of the tension ring 5.

FIG. 3 shows a tube conduit connection formed between two tube ends. Both the tubes may consist of the same or different materials; preferably, the tubes are made of cross-linked polyolefin and serve as conducting tubes for corrosive media. As an example there are mentioned industrial, however, particularly domestic waste waters which require especially corrosion resistant tube materials and with respect to which tubes made of cross-linked polyolefin have proven useful in practice.

In the illustrated exemplary embodiment, the two tubes have the same internal and external diameters. This, however, is not significant since the same tube conduit connection can also be produced between tubes of different diameters, if desired, provided that the differences in the internal diameters do not result in undue flow resistance and deposits. A first tube 10 has a first tube end 11; a second tube 12 has a second tube end 13. It will be seen that the internal diameter of the second tube end 13 is expanded and this expanded second tube end 13 is pushed onto the first tube end 11 of the first tube 10. This expansion is carried out using, for example, a conventional expanding mandrel at environmental temperature, as in the previous exemplary embodiments, and is subject to the described self-reconversion due to which the expanded tube end 13 tends to reassume its original shape. The large-area tight engagement between the two tube ends 11 and 13 produces, also in this case, a sealed tube conduit connection which, due to the corrosion resistance of the material against the aforementioned waste water, will not leak even after long-time use.

Also in this case, as in the exemplary embodiment illustrated in FIG. 2, the connection can be additionally secured by means of a tension ring; however, it must be observed in such case that no undue deformation of the first tube end 11 is produced under the compressive pressure exerted by such tension ring. Such deformation may present a flow resistance to the throughflowing waste water or may give rise to deposits formed from the waste water in the region of the connection area. Instead of the tension ring, a bonding agent may be employed, if desired, for additionally securing the connection area.

Tubes which are made of cross-linked polyolefin, therefore, are used in waste water technology also for this reason, because in this manner secure, self-sealing connections can be readily made between two smooth tubes. Additionally, there is obtained the further advantage that the tubes 10 and 13, which are produced in a continuous process, can also be placed or laid as continuous tubes without there being required specific angle tubes or other connecting members in order to place or lay the tubes in accordance with a predetermined pattern or course. Therefore, connections between tubes must only be made at the inlet and outlet locations.

I claim:

1. A method of producing a tube conduit connection, comprising the steps of:

selecting a tube made of cross-linked polyolefin and having a predetermined internal diameter;

providing a connector member having an external diameter greater than said predetermined internal diameter of said tube;

expanding a tube end of said tube at environmental temperature to an internal diameter which is greater than said external diameter of said connector member;

during said step of expanding said tube end, using an expanding mandrel for expanding said tube end to said internal diameter greater than said external diameter of said connector member;

removing said expanding mandrel from said expanded tube end;

telescoping said expanded tube end at environmental temperature onto said connector member substantially immediately after removing said expanding mandrel while said tube end is still in an expanded state; and permitting said telescoped, still expanded tube end to shrink at environmental temperature onto said connector member due to self-reconversion of said expanded tube end and thereby firmly and sealingly interconnecting said tube end and said connector member at said environmental temperature.

2. The method as defined in claim 1, further including the step of providing said connector member with a surface structure for increasing a surface for engagement with said tube end.

3. The method as defined in claim 1, further including the steps of:

selecting a tension ring which is made of a material which is expandable at environmental temperature and self-reconvertible at environmental temperature;

applying the tension ring to the tube end to be expanded; and expanding said expandable and self-reconvertible tension ring conjointly with said tube end.

4. The method as defined in claim 2, further including the steps of:

applying a tension ring to the tube in a region outside the tube end to be expanded;

after making the connection, hydraulically pushing said tension ring onto said expanded tube end, which surrounds said connector member;

selecting as said tension ring, a tension ring which is made of a material reversibly expandable sufficient for permitting said tension ring to be hydraulically pushed beyond said surface structure; and hydraulically pushing said tension ring beyond a surface structure provided on said connector member for increasing a surface for engagement with said tube end.

5. The method as defined in claim 3, wherein said step of selecting said tension ring includes selecting, as said tension ring, a tension ring made of cross-linked polyolefin.

6. A method of producing a tube conduit connection, comprising the steps of:

selecting a tube made of cross-linked polyolefin, said tube having a predetermined internal diameter and defining a tube end;

providing a connector member having an external diameter greater than said predetermined internal diameter of said tube;

selecting a tension ring made of cross-linked polyolefin;

applying said tension ring to said tube end of said tube;

expanding said tube end of said tube conjointly with said tension ring at environmental temperature to an internal diameter which is greater than said external diameter of said connector member;

during said step of expanding said tube end conjointly with said tension ring, using an expanding mandrel for expanding said tube end to said internal diameter which is greater than said external diameter of said connector member;

removing said expanding mandrel from said expanded tube end;

conjointly telescoping said expanded tube end and said expanded tension ring at environmental temperature onto said connector member substantially immediately after removing said expanding mandel from said expanded tube end; and permitting said still expanded tube end and tension ring to conjointly shrink at environmental temperature onto said connector member due to self-reconversion of said expanded tube end and tension ring and thereby firmly and sealingly interconnecting said connector member and said tube end and tensioning said tube end against said connector member by means of the shrunk tension ring at said environmental temperature.

7. A method of producing a tube conduit connection, comprising the steps of:

selecting a tube made of cross-linked polyolefin, said tube having a predetermined internal diameter and defining a tube end;

providing a connector member having an external diameter greater than said predetermined internal diameter of said tube and including a surface structure for increasing a surface of engagement with said tube end;

expanding said tube end at environmental temperature to an internal diameter which is greater than said external diameter of said connector member;

prior to said step of expanding said tube end, applying a tension ring, which is made of a reversibly expandable material, to said tube in a region outside of said tube end to be expanded;

during said step of expanding said tube end, using an expanding mandel for expanding said tube end to said internal diameter which is greater than said external diameter of said connector member;

removing said expanding mandrel from said expanded tube end;

substantially immediately after removing said expanding mandrel from said expanded tube end, telescoping said expanded tube end at environmental temperature onto said connector member such as to extend beyond said surface structure of said connector member;

permitting said still expanded tube end to shrink at environmental temperature onto said connector member and said surface structure thereof due to self-reconversion of said expanded tube end and thereby firmly and sealingly interconnecting said connector member and said tube end at said environmental temperature; and hydraulically pushing said tension ring onto said connector member to said region beyond said surface structure of said connector member and thereby tensioning said tube end against said connector member in said region located beyond said surface structure.

\* \* \* \* \*

UNITED STATES PATENT AND TRADEMARK OFFICE
CERTIFICATE OF CORRECTION

PATENT NO. : 5,735,554
DATED : April 7, 1998
INVENTOR(S) : Friedrich Imgram

It is certified that error appears in the above-indentified patent and that said Letters Patent is hereby corrected as shown below:

On the title page, items [19] and [75] inventor, "Fredrich Imgam" should be --Friedrich Imgram--

Signed and Sealed this

Thirtieth Day of June, 1998

*Attest:*

BRUCE LEHMAN

*Attesting Officer*    Commissioner of Patents and Trademarks